United States Patent

DeEdwardo et al.

[11] 4,042,561
[45] Aug. 16, 1977

[54] FLAME RETARDANT COMPOSITIONS CONTAINING POLYPHOSPHAZENES

[75] Inventors: Andrew H. DeEdwardo, Parsippany; Fred Zitomer, Livingston; Robert W. Stackman, Morristown; Charles E. Kramer, Florham Park, all of N.J.

[73] Assignee: Celanese Corporation, New York, N.Y.

[21] Appl. No.: 688,363

[22] Filed: May 20, 1976

[51] Int. Cl.² .................................................. C08K 5/49
[52] U.S. Cl. .......................... 260/45.9 NP; 106/15 FP
[58] Field of Search ............ 260/45.9 NP; 106/15 FP

[56] References Cited

U.S. PATENT DOCUMENTS

| | | | |
|---|---|---|---|
| 3,193,397 | 7/1965 | Stephens et al. | 106/15 FP |
| 3,364,189 | 1/1968 | Allcock et al. | 260/89.7 |
| 3,505,087 | 4/1970 | Godfrey | 106/15 FP |
| 3,711,524 | 1/1973 | Leebrick | 260/429.7 |
| 3,792,117 | 2/1974 | Kolodchin et al. | 260/864 |
| 3,859,249 | 1/1975 | MeNeely | 260/45.9 NP |
| 3,867,186 | 2/1975 | Hook et al. | 252/8.1 |
| 3,869,294 | 3/1975 | Lanier et al. | 260/927 N |

OTHER PUBLICATIONS

Journal of Polymer Science - vol. 13, 2531 - 2543 (1975) - Allcock et al.
Journal of Inorganic Chemistry - vol. 5; 1716 (1966) - White et al.
Polymer Engineering and Science - May 1975 vol. 15, No. 5 pp. 321 to 338 - article by Singler et al.

*Primary Examiner* — V. P. Hoke

[57] ABSTRACT

Normally flammable synthetic polymers selected from the group consisting of polyester resins, polyamide resins, cellulosic resins, polyolefins and their substituted derivatives, vinyl aryl compounds, polycarbonate resins, polyurethane resins and mixtures of the foregoing are rendered flame retardant by incorporating therein a flame retardant amount of polyphosphazene having the general formula:

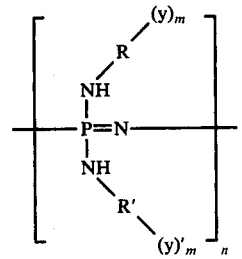

where $n$ is at least 10, R and R' may be the same or different and represent aryl groups, y and y' may be the same or different and represent halogen and halogen substituted and unsubstituted lower alkyl (e.g., 1 to 10 carbon atoms), aryl, alkoxy, and aryloxy groups, and $m$ = 0 to 10.

25 Claims, No Drawings

FLAME RETARDANT COMPOSITIONS CONTAINING POLYPHOSPHAZENES

BACKGROUND OF THE INVENTION

In recent years there has been a growing awareness of the need to render normally flammable organic materials less combustible. Prior art attempts to reduce the combustibility of such compositions by the incorporation of additives such as halogenated alkyl phosphates, halogenated bi-phenyls, halogenated bi-phenyl ethers, phosphine oxides, polyphosphates, halogenated copolymers, and certain polyphosphazenes have succeeded in varying degrees in achieving an acceptable level of flame resistance; however, this has usually been accompanied by degradation of one or more of the desirable properties of the polymer. Thus, many potentially suitable flame retardant candidates have proven unacceptable because of the tendency of these compounds to catalyze hydrolytic degradation reactions when present in the high concentrations required to impart flame retardancy. Such degradation results in overall polymer destabilization which is manifested by a severe drop in intrinsic viscosity (I.V.) and thermal stability. This problem is particularly acute when blending has been attempted in the melt or at other elevated temperatures. Attempts to circumvent this problem by padding have met with limited success because many flame-retardants have a tendency to migrate during the drawing process thereby producing a non-homogeneous distribution which has the effect of lowering the flame retardant activity and causing deposits on critical roller surfaces. Furthermore, padding generally increases both the cost and complexity of processing because of the additional ovens, baths, and solvent stripping steps that are required.

The introduction of flame retardant agents through copolymerization has proven to be only marginally successful. It has been observed, that the products formed generally exhibit a loss in properties such as a lowered softening point temperature. Cost is also adversely affected by this approach because of the almost certain modification of processing variables that result.

Certain polyphosphazenes have heretofore been utilized in prior art as illustrated by U.S. Pat. Nos. 2,681,295; 2,853,517; 3,193,397; 3,316,330; 3,356,769; 3,392,214; 3,450,799; 3,505,087; 3,792,117; 3,859,249; 3,867,186; 3,869,294 and 3,877,952.

It is therefore an object of the present invention to provide a flame retardant polyphosphazene compound capable of being blended with a normally flammable material without appreciable degradation of any of the properties of said normally flammable material resulting from thermal or hydrolytic instability.

It is a further object of the present invention to provide a process for the production of a polymeric flame retardant composition which exhibits extremely high critical oxygen concentration (hereinafter C.O.C.) values as a result of the particular phosphazene compounds incorporated therein.

It is still a further object of the present invention to provide polyphosphazene containing compositions which are flame retardant, economically acceptable, and effectively nonflammable at low levels of concentration of the particular polyphosphazene compound incorporated therein.

It is still another object of this invention to provide a polyphosphazene containing composition capable of functioning as a flame retardant in both the gas and bulk phase.

These and other objects, as well as the scope, nature, and utilization of the invention will be apparent to those skilled in the art from the following description and appended claims.

SUMMARY OF THE INVENTION

In one aspect of the invention there is provided a composition comprising a normally flammable organic material selected from the group consisting of polyester resins, polyamide resins, cellulosic resins, polyolefins and their substituted derivatives, vinyl aryl compounds, polycarbonate resins, polyurethane resins and mixtures of the foregoing, and a flame retardant amount of a polyphosphazene compound having the formula:

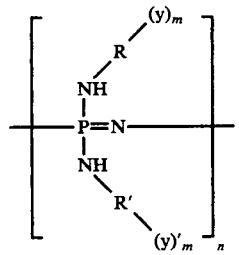

where $n$ is at least 10, R and R' may be the same or different and represent aryl groups, y and y' may be the same or different and represent halogen and halogen substituted and unsubstituted lower alkyl (e.g., 1 to 10 carbon atoms), aryl, alkoxy, and aryloxy groups, and $m = 0$ to $10$.

In another aspect of the present invention there is provided a process for the production of a flame retardant composition comprising intimately admixing a normally flammable organic material and a flame retardant amount of the above-described polyphosphazene compound.

It has been discovered that blends of the above-described polyphosphazenes, preferably at levels of about 10 percent, in various organic polymers show a minimal effect on thermal stability. This allows the flame retardant to function without the abovementioned polymer degradation. The polyphosphazene compounds hereinafter described, are sufficiently stable to allow use even at elevated temperatures encountered during critical processing operations such as blending and spinning.

It has also been discovered that although many polyphosphazenes operate primarily in the gas phase to effect flame quenching, there are certain anilino derivatives which operate both in the gas and bulk phase of the polymer to that same effect.

DESCRIPTION OF PREFERRED EMBODIMENTS

The polyphosphazene compound which is blended with a normally flammable organic material selected from the group consisting essentially of polyester resins, polyamide resins, cellulosic resins, polyolefins and their substituted derivatives, vinyl aryl compounds, polycarbonate resins, polyurethane resins and mixtures of the foregoing, in accordance with the present invention has recurring units of the structural formula

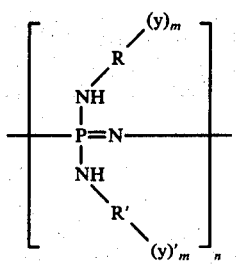

where n is at least 10, R and R' may be the same or different and represent aryl groups, y and y' may be the same or different and represent halogen and halogen substituted and unsubstituted lower alkyl (e.g., 1 to 10 carbon atoms) aryl, alkoxy, aryloxy groups, and $m = 0$ to 10.

Representative examples of R and R' include phenyl, naphthyl, bi-phenyl, and the like.

Representative examples of y and y' include halogen substituted and unsubstituted ethyl, propyl, isopropyl, butyl, isobutyl, hexyl, phenyl, bi-phenyl, B-naphthyl, bi-phenyloxy phenyl, phenoxyphenyl, methoxy, propoxy, butoxy and the like.

Specific examples of the polyphosphazene additives include poly-[bis(p-fluoro aniline)phosphazene]; poly-[bis(anilino) phosphazene]; poly-[bis(p-chloro aniline) phosphazene]; poly-[bis(p-bromo aniline)phosphazene].

The polyphosphazene compound of the present invention is a linear polymer wherein n may vary from about 10 to about 15,000 (e.g., 100 to 1,000).

A preferred embodiment of the present invention includes the halogen substituted derivatives where y and y' may be selected from the group consisting of chlorine, fluorine and bromine in the above described structure and R and R' = phenyl, $m = 1$ to 10.

A particularly preferred embodiment of the present invention includes fluorine substituted polyphosphazene compounds where y and y' = F and R and R' = phenyl in the above-described formula.

It has been discovered that polyphosphazenes of the present invention generally operate in the gas phase as well as in the bulk phase of the organic material to effect flame quenching while the generation of catalytic species which would initiate polymer degradation through hydrolysis is minimal. These polyphosphazenes generate primarily low molecular weight fragments which volatilize into the flame front under burning conditions. Quenching then results from an oxygen diffusion barrier or heat sink type mechanism. The anilino derivatives of the present invention also operate in bulk phase of the organic material to effect quenching. Thus, following degradation and evolution of relatively low molecular weight volatiles into the flame front a thermally stable inorganic residue is deposited on the normally flammable organic material which acts to quench the flame through the formation of an impervious oxygen diffusion barrier.

The aforementioned fire retardant polyphosphazenes which are suitable for incorporation into compositions of this invention can be prepared by a variety of synthesis routes as will be apparent to those skilled in the art. Thus a suitable method of preparation may be found in U.S. Pat. No. 3,364,189 which is herein incorporated by reference.

A preferred method of preparing the anilino derivatives is as follows: The ring structure of hexachlorocyclotriphosphazene is opened by heating to a temperature of about 250° C in vacuo to yield polydichlorophosphazene. The polymer thus formed is reacted with various organo nucleophiles as described in R. E. Singler, N. S. Schneider, and G. L. Hagnauer, *Polm. Eng. and Sci.*, 15, 321 (1975) and H. R. Allcock, G. Y. Moore, W. J. Cook, *Macro. Molecules*, 7, 571 (1974) which are herein incorporated by reference. Such reaction may be summarized by the following equation:

(1)

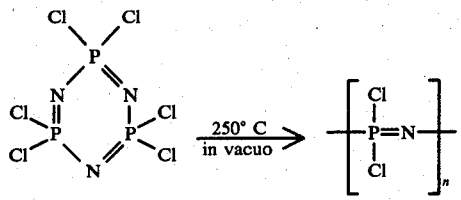

(2)

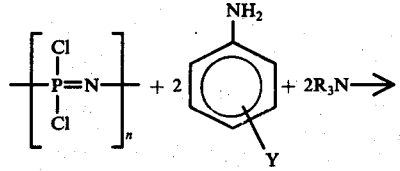

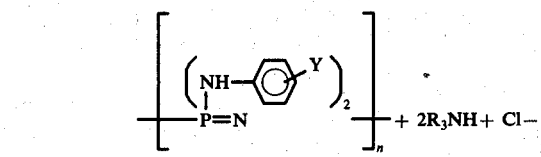

wherein y may be as hereinabove described and n may vary from 10 to about 15,000.

Generally the polyphosphazene is polymerized to an extent sufficient to obtain a polymer having an inherent viscosity of about 1 or greater.

The inherent viscosity is determined by measuring the relative viscosity of a 0.1% solution of the polymer at 25° C in a suitable solvent, such as a 10/7 (w/w) mixture of phenol trichlorophenol. The viscosity of the polymer solution is measured relative to the solvent alone and the inherent viscosity (I.V.) is determined from the following equation:

$$I.V. = \frac{l_n \frac{V_2}{V_1}}{C}$$

In the above formula, $V_2$ is the efflux time of the solution, $V_1$ is the efflux time of the solvent, and C is the concentration expressed in grams of polymer per hundred milliliters of solution. As is known in the polymer art, inherent viscosity is monotonically related to the molecular weight of the polymer.

Typically, the molecular weight of the phosphazene polymers may vary from about 2,300 to about 3,500,000.

The flame retarding agents described herein may be preferably employed to reduce the flammability of condensation type polymers such, for example, as polyesters, cellulosics, as well as polystyrene.

The polyesters are a preferred class of synthetic polymers which may satisfactorily be rendered flame retardant in accordance with the present invention. In general it may be said that the present invention is applicable to all polyesters including those prepared by reacting aromatic, alicyclic, aliphatic, and cycloaliphatic dibasic acids and their condensable derivatives such as diesters, acyl chlorides, and anhydrides, with aromatic, alicyclic, aliphatic, and cycloaliphatic diols and their derivatives. The preferred polyesters employed in the practice of this invention are the polyalkylene terephthalates selected from the group consisting of polypropylene terephthalate, polybutylene terephthalate, and polyethylene terephthalate.

These polyesters may be formed by any of the polymerization techniques known in the art. Thus, polyethylene terephthalate may be prepared by reacting terephthalic acid or a dialkyl or diaryl esters of terephthalic acid (e.g., dimethyl terephthalate or diphenyl terephthalate) with ethylene glycol. A catalyst such as antimony oxide is commonly employed during the polymerization. The polyethylene terephthalate component preferably exhibits an inherent viscosity (I.V.) of about 0.5 to 1.0, and in a particularly preferred embodiment an inherent viscosity of about 0.6 to 0.95. The I.V. of the polymer may be determined by the equation found at page 8 wherein the viscosity of a dilute solution of the polymer is divided by the viscosity of the solvent employed (measured at the same temperature), and C is the polymer concentration in the solution expressed in grams/100 ml. The inherent viscosity may be conveniently determined from a solution of 0.1 gram of polymer in 100 ml. of ortho-chlorophenol at 25° C. Polyethylene terephthalate commonly exhibits a glass transition temperature of about 75° C, and a melting point of about 250° to 265° C, e.g., about 260° C.

Polypropylene terpehthalate and polybutylene terephthalate are polymers of the general type described in U.S. Pat. No. 2,465,319 to Whinfield and Dickson and can be prepared from the reaction product of a dibasic acid, such as terephthalic acid or a dialkyl ester of terephthalic acid (especially dimethyl terephthalate) and diols having 3 and 4 carbon atoms. Suitable diols include 1,3-propanediol, 1,4-butanediol, 1,3-butanediol, 1,2-propanediol, 1,2-butanediol, 2,3-butanediol, and the like.

In the production of the polypropylene terephthalate or polybutylene terephthalate, the appropriate bis(hydroxyalkyl) terephthalate is produced as the intermediate. The bis(hydroxyalkyl) terephthalate can be prepared by reacting the dialkyl ester of terephthalic acid in which the alkyl radicals can contain from 1 to 7 carbon atoms with about two molecular proportions of the diols described above. It is preferred to use higher proportions of the diol, i.e., in excess of 1.5 moles of the diol per mole of the terephthalate derivative, since by using such proportions, the initial transesterification is caused to take place more rapidly and completely.

The esterification reaction is conducted under conditions of elevated temperatures and atmospheric, subatmospheric or superatmospheric pressure. Normally, the desired temperature for the polyalkylene terephthalate forming reaction can range from about the boiling temperature of the reaction mixture to as high as 275° C if desired.

It is recommended that the polypropylene terephthalate or polybutylene terephthalate utilized in the present composition have an inherent viscosity of about 0.5 to 1.0 deciliters per gram, and most preferably an inherent viscosity of about 0.5 to 0.95 deciliters per gram. The inherent viscosity of a given polyalkylene terephthalate sample may be determined at a concentration of 0.1 percent by weight in solvent consisting of 10 parts by weight phenol and 7 parts by weight trichlorophenol.

Other normally flammable synthetic polymers capable of being blended with the disclosed polyphosphazene compounds include other thermoplastic polymers. Illustrative of the thermoplastic polymers in addition to the polyesters which may be employed in the practice of this invention include:

1. Polyamide resins, i.e., the resins made by the condensation of di- or polyamines with di- or polybasic acids or by polymerization of lactams or amino acids. Typical polyamides include nylon which is made from pyrrolidone, nylon 6 obtained by polycondensation of caprolactam; nylon 66 obtained by the condensation of hexamethylene diamine with adipic acid; nylon 610 obtained by the condensation of hexamethylenediamine with sebacic acid; nylon 7 which is a polymer of ethyl aminoheptanoate; nylon 9 made from 9 aminononanoic acid; and, nylon 11 made from 11 amino undecanoic acid;

2. Cellulosic resins including cellulose esters and mixed esters such as cellulose acetate, cellulose triacetate, cellulose acetate-butyrate, cellulose acetate-propionate; cellulose ethers, such as ethyl cellulose;

3. Polyolefins and their substituted derivatives which include:
A. the polyalpha-olefins such as polypropylene and polyethylene and copolymers of one or more alpha-olefins, such as ethylene or propylene, with a minor proportion of one or more ethylenically unsaturated monomers including 4-methyl pentene-1, butene-1 norbornene and its derivatives; cyclopentadiene; cyclopentene; cyclobutene; vinyl acetate; the $C_1$-$C_{12}$ alkyl acrylate and methacrylate esters; as well as blends of the homo- and copolymers of alpha-olefins with other types of thermoplastic polymers;
B. polyvinyl chloride and the copolymers of vinyl chloride with a minor proportion of one or more vinyl comonomers such as the vinyl alkyl esters, as exemplified by vinyl acetate.

4. Vinyl aryl compounds such as:
A. polystyrene and copolymers of styrene or alpha-methyl styrene with a minor proportion of one or more ethylenically unsaturated comonomers such as nitriles of ethylenically unsaturated carboxylic acids including acrylonitrile and methacrylonitrile; and $C_1$-$C_{12}$ alkyl esters of acrylic and methacrylic acid such as methyl methacrylate and 2-ethylhexyl acrylate; and graft copolymers of styrene or alpha-methylstyrene with polybutadiene and other hydrocarbon elastomers;
B. styrene-butadiene rubber (SBR) systems comprising about 3 parts of butadiene copolymerized with one part of styrene;

5. Polycarbonate resins, i.e., the resins derived from the reaction between a difunctional alcohol or phenol, such as bisphenol A, and phosgene or an alkyl or aryl carbonate;

6. Polyurethane resins, i.e., the resins formed by the reaction between a bi- or polyfunctional hydroxyl containing compounds, such as polyether or polyester, and a di- or polyisocyanate such as toluene diisocyanate or diphenylmethane-4,4'-diisocyanate.

With respect to proportions, the amount of polyphosphazene additive which may be admixed with the various polymer substrates will depend, primarily upon such factors as the particular polyphosphazene and polymer substrate which are to be blended with one another, the degree of fire retardency desired in the resulting blend, the degree of clarity, hardness and other specific physical properties which are sought as well as other technical and economic considerations known and understood by those skilled in the art. Thus while any effective amount of the above-described fire retardant polyphosphazene compounds may be employed to reduce flammability, it is generally desirable that this effective amount constitute from about 5 percent to about 40 percent; preferably from about 5 percent to about 30 percent; most preferably from about 8 percent to about 15 percent (e.g., about 10%) based on the weight of the normally flammable organic material hereinabove described, in order to avoid possible loss of physical properties in the shaped article produced.

The actual blending of the polyphosphazene additives with the selected polymeric substrate, i.e., with any one or more of the described polymers, may be accomplished by means of any convenient procedure which will result in an intimate admixture of the additive within the mass of the substrate polymer. Thus, for example, an aqueous suspension containing the particles of the phosphazene additive may simply be blended or otherwise admixed with the substrate polymer. Or, if desired the polyphosphazene additive and the polymer substrate may be admixed while each is in the form of a solid powder and thereafter formed into the desired product.

The blending operation may also be carried out by means of a procedure in which the polymer which comprises the substrate, is itself, polymerized while in the presence of an aqueous emulsion or suspension or organic solvent solution containing the previously polymerized phosphazene additives.

In another alternative the phosphazene additives may be mixed with the fiber forming synthetic polymer, e.g., polyesters, the mixture ground to suitable particle size (e.g., 60 mesh) and coextruded, or the additives and said synthetic polymers may both be dissolved, the solutions combined and formed into shaped structures by wet or dry spinning.

In a still further alternative non-meltable polyphosphazenes may be ground and dispersed in solution or melts of the fiber forming synthetic polymers.

The resulting fibrous structure, having the specific polyphosphazene flame retardant additive present therein, may be in the form of a fabric possibly blended with other similarly prepared fibrous materials such as cotton, nylon, acetate, acrylics, and the like.

The temperature at which the polyphosphazene and the normally flammable organic material are blended may vary depending on the particular method of blending utilized, as would be obvious to one skilled in the art, provided the temperature does not exceed the point at which the organic material begins to degrade. Where melt blending is employed the temperature utilized must be above the melting point of the polymer and below its thermal degradation point. Thus blending temperatures for polyesters generally should not exceed 330° C.

The fire retardant compositions of this invention can be prepared so as to contain various optional additives as would be obvious to one skilled in the art which may include plasticizers such as the alkyl esters of phthalic, adipic and sebacic acids such, for example, as dioctyl phthalate and ditridecyl phthalate and aryl phosphate esters, such as, diphenyl and tricresyl phosphate, etc.; lubricants and mold release agents such as stearic acid or its metal salts, petroleum based waxes, mineral oils, polyethylene waxes, etc.; and heat and light stabilizers, such as barium, cadmium, calcium, zinc soaps or phenates, basic lead compounds, organo-tin compounds, such as dialkyl tin mercaptides and dialkyl tin maleates, thiolauric anhydride and n-butyl stannoic acid, epoxidized oils, alkyl diphenyl phosphites, triaryl phosphites, phenyl salicylates, benzophenones and benzotriazoles, etc. For a more complete listing of plasticizers, lubricants, stabilizers and other functional additives, one may consult "Polyvinyl Chloride" by H. A. Sarvetnick published by Van Nostrand Reinhold Co., New York, New York, in 1969.

These polymer compositions may also contain fillers, pigments, dyes, opacifying agents, decorative additives such as reflective metal foils or flakes, and other imbedded solid objects such as fiber glass, textile fibers, asbestos, paper, and the like, provided that they do not detract from the flame retardancy of these products. In addition, the compositions may contain other flame retardants such as antimony compounds, halogenated alkyl phosphates or phosphonates, alkyl acid phosphates, or small concentrations of phosphoric acid.

The novel polyblends of this invention comprising blends of any of the above-described polymers with one or more of the polyphosphazene additives of this invention, may be utilized in any of the coating impregnating and molding applications known to those skilled in the art wherein it is desired to provide fire retardancy to the resulting end product. For example, these compositions may be used for preparing such diverse items as calendered films, blow molded bottles, extruded and blown films, extruded and shaped articles such as panels, tubes, sheets, rods, fibers, particularly with polyester fibers, and textiles based on these fibers, and in carrying out such processes as injection molding, fluidized bed coatings, electrostatic powder spraying and rotational coating, etc. More particularly, those polyblends which are optionally clear such, for example, as those based upon copolymers of styrene may be utilized for preparing such articles as lenses, aircraft canopies, windows, windshields, lighting fixtures and advertising displays. Applications wherein optical clarity is not essential include such automotive applications as seat backs, door panels, instrument panels, heat rests, arm rests, package shelves, plated hardware, radiator grills, fender extensions and liners, wheel covers and gas tanks. Non-automotive applications include their use as structural and decorative components for both the interiors and exteriors of conventional houses and mobile homes and as structural and decorative elements of business machines and electrical appliances.

In addition to being used as fire retardant additives for the preparation of fire retardant polyblends with burning synthetic organic materials, the polyphosphazene additives of this invention may be used, per se, in any of the various coating, adhesive, laminating, impregnating and molding applications known to those skilled in the art. Thus, they may be coated upon and/or absorbed by all types of previously prepared substrates to which it is desired to impart fire retardant properties. They may, therefore, be used as coatings, impregnants, fillers, laminants, and adhesives for such substrates as wood, cotton, paper, textiles based on either natural or synthetic fibers or blends thereof; synthetic polymer films such as those based upon polyolefins, regenerated cellulose, i.e., cellophane, polyvinyl chloride, polyesters and the like; leather, natural and synthetic rubber; fiberboard; and synthetic plastics prepared by means of either addition or condensation polymerization techniques.

Blending of the above-described polymers with the disclosed polyphosphazenes typically results in a polymer with reduced flammability as shown by the increased critical oxygen concentration index values.

COC is defined as the lowest oxygen concentration in nitrogen at which steady combustion, without dripping, takes place on a vertically positioned polymer specimen after ignition at the top surface. The ignition flame is provided from a 22 gauge syringe through which passes $H_2$ gas which is ignited thereby yielding a flame having a temperature of about 3,000° C. Dripless combustion is attained by using a specimen of small diameter containing a wick. The COC values are determined in an all glass testing chamber containing $O_2$ and $N_2$ under quiescent flow conditions. The composition of the $O_2/N_2$ mixtures can be regulated and monitored continuously. A detailed description of the equipment may be found in D. E. Steutz, *Proceedings from the Conference on Fundamentals of Flammability and Combustion of Materials*, Polymer Conference Series, College of Engineering, University of Utah, Salt Lake City, Utah (1970).

Test specimens are obtained from solution cast, or compression molded, films cut into strips approximately 0.125 in. wide, 2 in. long and 0.04 in. in thickness. These strips are wound loosely with a stainless steel wire of 0.007 in. diameter. Actual COC values are measured on samples suspended vertically in the testing chamber and ignited at the top surfaces.

This invention will be further illustrated by the following examples. However, no limitations, other than those incorporated in the appended claims, are to be employed.

EXAMPLES

A polyphosphazene derivative corresponding to the formula:

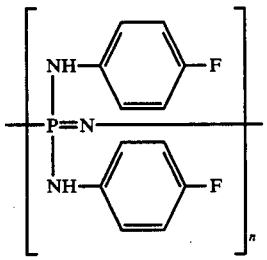

where $n$ is at least 10, is prepared by the melt ring opening polymerization of hexachlorocyclotriphosphazene to form polydichlorophosphazene at a temperature of about 250° C and reduced pressure.

To 100 parts by weight of the polydichlorophosphazene are added 191.8 parts by weight of p-fluroaniline and 174.6 parts by weight of triethylamine and the resultant slurry is refluxed in tetrahydrofuran (T.H.F.) for about 24 hours to form poly[bis(p-fluroaniline)phosphazene]. The resulting phosphazene polymer is then precipitated into ethanol (non-solvent) washed and dried.

In a similar manner poly[bis(anilino)phosphazene][($\phi$-NH)$_2$P=N]$_n$ is prepared.

As representative of the normally flammable synthetic organic polymer polyethylene terephthalate, cellulose acetate, cellulose triacetate and polystyrene are prepared and tested with the polyphosphazene compounds described above.

Thus film or fiber grade polyethylene terephthalate is prepared by any method known to those skilled in the art such as described in U.S. Pat. No. 2,465,319 to Whinfield and Dickson.

Cellulose acetate with a combined acetic acid content of about 55 percent is prepared by any manner known to one skilled in the art. Thus cellulose (wood pulp or cotton linters) may be reacted with acetic acid, acetic anhydride, and sulfuric acid as a catalyst. The cellulose is fully acetylated (three acetate groups per glucose unit) and at the same time the sulfuric acid causes appreciable degradation of the cellulose polymer so that the product contains only 200–300 glucose units per polymer chain. At this point in the process the cellulose acetate ordinarily is partially hydrolyzed by the addition of water until an average of 2–2.5 acetate groups per glucose unit remain.

In a similar manner cellulose triacetate is prepared by reacting purified cellulose with acetic anhydride in the presence of sulfuric acid as a catalyst and glacial acetic acid as a solvent followed by very slight hydrolysis. The percent combined acid content is about 62.5 percent.

A molding grade polystyrene polymer is prepared by any manner known to those skilled in the art such as by free radical polymerization using a peroxide catalyst.

Blends comprising 10 percent, by weight, of each of the two above-described anilino substituted polyphosphazene derivatives and 90 percent, by weight of said polyethylene terephthalate are then prepared. Thus, the polyethylene terephthalate and each of the phosphazene additives are individually ground to an extent sufficient to enable them to pass through a 60 mesh screen. A 10:90 batch of each phosphazene:PET blend is manually mixed and passed several times through a grinding mill fitted with a 60 mesh screen to form a powdered blend. The blend is then compression molded into a film of about 0.04 inch in thickness.

The cellulose acetate, cellulose triacetaate, triacetate, poly styrene compounds previously prepared are blended in the same amounts with the same two anilino substituted phosphazenes and molded into a film in the same manner as above. These blends are then subjected to the above described COC Index Test.

To provide a comparison with various other phosphazene compounds several compounds conforming to the recurring structural formula

wherein Z represents various alkoxy, phenoxy, and a piperidino group as described in Chart I, Table II are also provided, blended, and tested in accordance with the procedures outlined above. The resulting COC values obtained are set out in chart form, (see Chart I, Table II).

The data presented shows that the various synthetic polymers, by themselves, as expected, show the lowest COC values while the presence of the halogenated anilino phosphazenes yields the highest increase in the COC values up to about 23.4.

The burn type test results signify the effect of the flame on the polymer as applied in accordance with the COC test as determined by an observer.

Experiments are conducted to illustrate decomposition mechanisms for various representative polyphosphazenes including that utilized in the present invention.

The degradations are carried out under simulated burning conditions at 375° C in 1 percent oxygen. Thermogravimetric mass spectrometric analysis (hereinafter TGA-ms) is used to follow the thermal behavior and to identify the resulting gases given off. The results of the test are set out in chart form at Chart II.

As shown in the reaction sequences, all of the phosphazenes, with the exception of the anilino derivative, undergo depolymerization to yield predominantly the corresponding cyclic trimer along with lesser amounts of branched substituents and higher oligomers. The fluoro-anilino derivative does not form the cyclic trimer. It decomposes instead to liberate the branch substituent, p-fluoroaniline, a low molecular weight volatile, and a large residue (~ 45 percent) which is thermally stable to 870° C. The structure of this residue has not as yet been determined. This residue is predominantly inorganic and contributes to the high flame retardancy of this compound by depositing an impervious oxygen diffusion barrier subsequent to the evolution of volatiles. Thus, the thermo-oxidative characteristics of a fluoro-anilino derivative such as poly[bis(p-fluoroaniline)phosphazene] and the fluoralkoxy derivative such as poly[bis(p-fluorophenoxy) phosphazene] are such that the fluoro-anilino derivative loses only about 50 percent of its weight at temperatures of about 500° to 1000° C while the fluoro-alkoxy derivative loses about 90 percent of its weight.

Although the invention has been described with preferred embodiments, it is to be understood that variations and modifications may be resorted to as will be apparent to those skilled in the art. Variations and modifications are to be considered within the purview and the scope of the claims appended hereto.

TABLE I
CHART I

| Example | Polymer | % Additive | Polyphosphazene | COC Value* | Burn Type |
|---|---|---|---|---|---|
| 1 | PET | 10 | [(F—φ—NH)$_2$P=N]$_n$ | 22.9 | Char |
| 2 | CTA | 10 | [(φ—NH)$_2$P=N]$_n$ | 21.3 | Char |
| 3 | CTA | 10 | [(F—φ—NH—)$_2$P=N]$_n$ | 23.4 | Char |
| 4 | CA | 10 | [(φ—NH—)$_2$P=N]$_n$ | 21.1 | Char |
| 5 | CA | 10 | [(F—φ—NH)$_2$P=N]$_n$ | 22.7 | Char |
| 6 | PS | 10 | [(φ—NH—)$_2$P=N]$_n$ | 17.4 | Melt |
| 7 | PS | 10 | [(F—φ—NH)$_2$P=N]$_n$ | 20.1 | Char/Melt |

*Note all values represent percent by volume.
CA = cellulose acetate
CTA = cellulose triacetate
PET = polyethylene terephthalate
PS = polystyrene

TABLE II
CHART I

| Comparative Example | Polymer | % Additive | Z Group | COC Value* | Burn Type |
|---|---|---|---|---|---|
| 8 | PET | 0 | — | 18.8 | Melt |
| 9 | PET | 10 | φ—O—φ—O | 20.5 | Melt |
| 10 | PET | 10 | CH$_3$—O—φ—O | 22.0 | Melt |
| 11 | PET | 10 | (Cl)CH$_3$—φ—O— | 22.6 | Melt |
| 12 | PET | 10 | Br—φ—O— | 22.8 | Melt |
| 13 | CTA | 0 | — | 19.3 | Melt |
| 14 | CA | 0 | — | 19.0 | Melt |
| 15 | CTA | 10 | F—φ—O— | 21.2 | Char |
| 16 | CA | 10 | F—φ—O | 20.3 | Char |
| 17 | CA | 10 | ⟨cyclohexyl⟩N— | 21.8 | Char |
| 18 | CA | 10 | Cl—φ—O— | 20.9 | Melt |
| 19 | PS | 0 | — | 16.9 | Melt |
| 20 | PS | 10 | CF$_3$—CH$_2$—O— | 19.3 | Melt |
| 21 | PS | 10 | F—φ—O— | 18.2 | Melt |
| 22 | PS | 10 | Cl—φ—O— | 18.3 | Melt |

*Note all values represent percent by volume.
CA = cellulose acetate
CTA = cellulose triacetate
PET = polyethylene terephthalate
PS = polystyrene

CHART II
POLYPHOSPHAZENE DEGRADATION PRODUCTS
AT 375° C IN 1% OXYGEN

1.

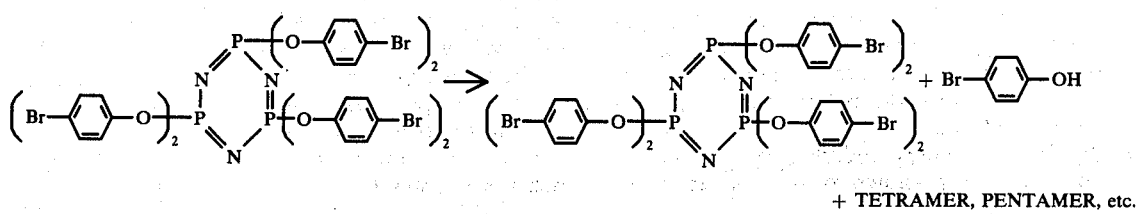

+ TETRAMER, PENTAMER, etc.

CHART II-continued
POLYPHOSPHAZENE DEGRADATION PRODUCTS AT 375° C IN 1% OXYGEN 2.
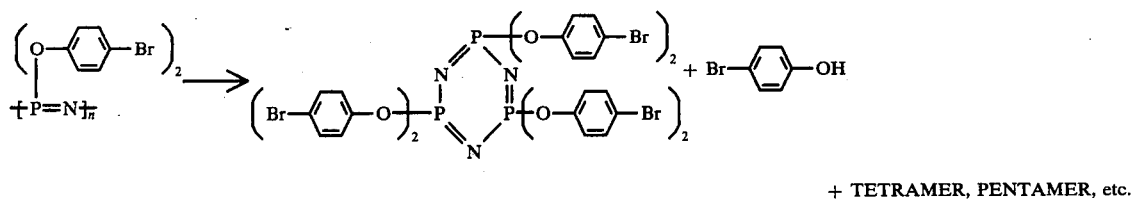

+ TETRAMER, PENTAMER, etc.

3.
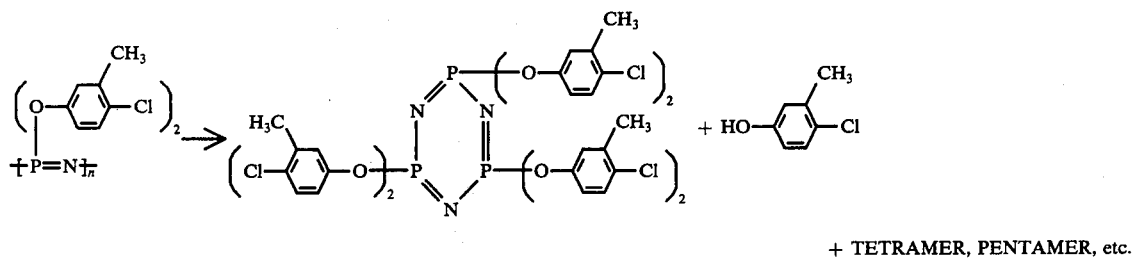

+ TETRAMER, PENTAMER, etc.

4.
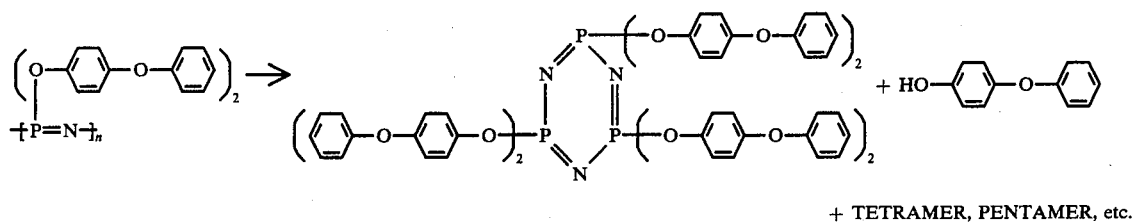

+ TETRAMER, PENTAMER, etc.

5.
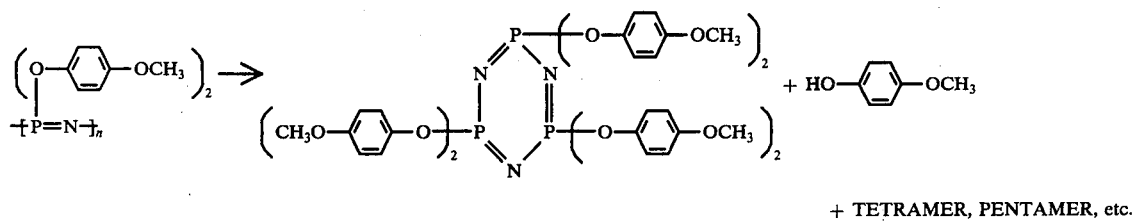

+ TETRAMER, PENTAMER, etc.

6.
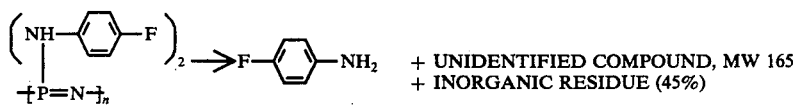  + UNIDENTIFIED COMPOUND, MW 165
+ INORGANIC RESIDUE (45%)

What is claimed is:

1. A flame retardant composition comprising a normally flammable organic material selected from the group consisting of polyester resins, polyamide resins, cellulosic resins, polyolefins and their substituted derivatives, vinyl aryl polymers, polycarbonate resins, polyurethane resins and mixtures of the foregoing, and a flame retardant amount of a polyphosphazene compound corresponding to the formula:

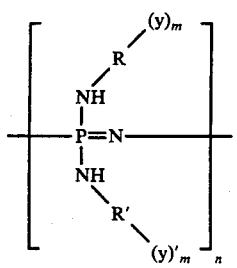

when $n$ is at least 10, R and R' may be the same or different and represent aryl groups, $y$ and $y'$ may be the same or different and represent halogen and halogen substituted and unsubstituted alkyl, aryl, alkoxy, aryloxy groups, and $m$ = o to 10, which compound exerts a flame retardant effect in the gas phase and the bulk phase.

2. The flame retardant composition of claim 1 wherein y and y ' is a halogen selected from the group consisting of fluorine chlorine and bromine in said polyphosphazene compound.

3. The flame retardant composition of claim 1 wherein R and R' are phenyl and y and y' is a halogen selected from the group consisting of fluorine, chlorine and bromine.

4. The flame retardant composition of claim 1 wherein n is from about 100 to 15,000.

5. A flame retardant composition comprising a normally flammable organic material selected from the group consisting of polyethylene terephthalate, cellulose acetate, cellulose triacetate, and polystyrene and a flame retardant amount of a polyphosphazene compound corresponding to the formula:

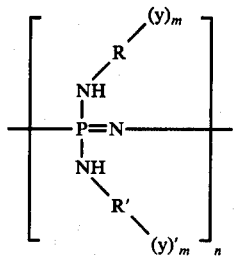

where $n$ is at least 10, R and R' may be the same or different and represent aryl groups, y and y' may be the same or different and represent halogen and halogen substituted and unsubstituted alkyl, aryl, alkoxy, aryloxy groups, and $m = 0$ to 10, which compound exerts a flame retardant effect in the gas phase and the bulk phase.

6. The flame retardant composition of claim 5 wherein y and y' is a halogen selected from the group consisting essentially of fluorine chlorine and bromine in said polyphosphazene compound.

7. The flame retardant composition of claim 5 wherein R and R' are phenyl and y and y' are a halogen selected from the group consisting of fluorine, chlorine and bromine.

8. The flame retardant composition of claim 5 wherein n is from about 100 to 15,000.

9. The flame retardant composition of claim 5 wherein the polyphosphazene compound is present in an amount of about 5 to about 30 percent.

10. A flame retardant composition comprising a polyester and a flame retardant amount of a polyphosphazene compound having the formula:

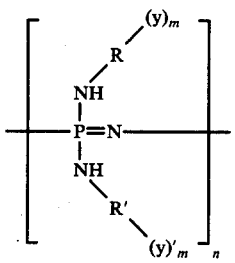

wherein $n$ may vary from about 100 to about 15,000, R and R' may be the same or different and represent aryl groups, y and y' may be the same or different and represent halogen and halogen substituted and unsubstituted alkyl, aryl, alkoxy, aryloxy groups, and $m = 0$ to 10, which compound exerts a flame retardant effect in the gas phase and the bulk phase.

11. The flame retardant composition of claim 10 wherein y and y' is a halogen selected from the group consisting of fluorine, chlorine, and bromine in said polyphosphazene compound.

12. The flame retardant composition of claim 10 wherein R and R' is phenyl and y and y' is fluorine.

13. A flame retardant composition comprising a polyalkylene terephthalate selected from the group consisting essentially of polyethylene terephthalate, polypropylene terephthalate, and polybutylene terephthalate and a flame retardant amount of a polyphosphazene compound having the formula:

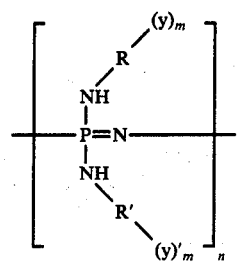

where $n$ may vary from about 100 to about 15,000, R and R' may be the same or different and represent phenyl groups, and y and y' may be the same or different and represent a halogen selected from the group consisting of fluorine, chlorine, and bromine in said polyphosphazene compound, and $m = 1$ to 10, which compound exerts a flame retardant effect in the gas phase and the bulk phase.

14. The flame retardant composition of claim 13 wherein the polyphosphazene compound is present in an amount not exceeding 15 percent, by weight, of the flame retardant composition.

15. The flame retardant composition of claim 13 wherein the polyphosphazene compound is present in an amount ranging from 8 to 15 percent, by weight, of the flame retardant composition.

16. The flame retardant composition of claim 13 wherein the polyphosphazene compound is present in an amount of about 10 percent.

17. The flame retardant composition of claim 13 wherein R and R' is phenyl and y and y' is fluorine.

18. A process for the production of a flame retardant polyester composition comprising intimately admixing with said polyester a flame retardant amount of a polyphosphazene compound having the formula:

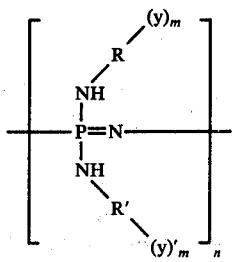

where $n$ may vary from about 100 to about 15,000, and R and R' may be the same or different and represent aryl groups, y and y' may be the same or different and represent halogen and halogen substituted and unsubstituted alkyl, aryl, alkoxy, aryloxy groups, and $m = 1$ to 10, which compound exerts a flame retardant effect in the gas phase and the bulk phase.

19. The process of claim 18 wherein the polyester is a polyalkylene terephthalate selected from the group consisting essentially of polyethylene terephthalate, polypropylene terephthalate, and polybutylene terephthalate.

20. The process of claim 19 wherein y and y' is a halogen selected from a group consisting essentially of fluorine, chlorine, and bromine in said polyphosphazene compound.

21. The process of claim 18 wherein R and R' are phenyl and y and y' is a halogen selected from the group consisting of fluorine, chlorine and bromine.

22. A process for the production of a flame retardant polyester composition comprising intimately admixing a polyalkylene terephthalate selected from the group consisting of polyethylene terephthalate, polypropylene terephthalate, and polybutylene terephthalate, with a flame retardant amount of a polyphosphazene compound having the formula:

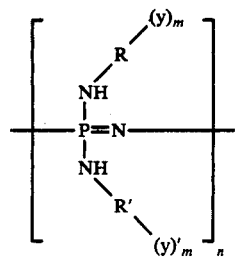

where $n$ may vary from about 100 to about 15,000, R and R' equal phenyl, y and y' is a halogen selected from the group consisting essentially of fluorine, chlorine, and bromine, in said polyphosphazene compound, and $m = 1$ to 10, which compound exerts a flame retardant effect in the gas phase and the bulk phase.

23. The process of claim 22 wherein the polyphosphazene compound is present in an amount not exceeding 15 percent, by weight, of the flame retardant composition.

24. The process of claim 22 wherein the polyphosphazene is incorporated into the polyester at a temperature not exceeding 330° C.

25. The process of claim 22 wherein y and y' = fluorine in said polyphosphazene compound and wherein said polyphosphazene compound is present in an amount of about 10 percent, by weight, of the flame retardant composition.

* * * * *